(12) United States Patent
Enderle et al.

(10) Patent No.: US 9,156,942 B2
(45) Date of Patent: Oct. 13, 2015

(54) METHOD AND DEVICE FOR CLEANING AN ABSORPTIVE POLYESTER

(75) Inventors: Anja Enderle, Ingelheim (DE); Manfred Schmitt, Ingelheim (DE)

(73) Assignee: Evonik Roehm GmbH, Darmstadt (DE)

( * ) Notice: Subject to any disclaimer, the term of this patent is extended or adjusted under 35 U.S.C. 154(b) by 915 days.

(21) Appl. No.: 13/032,198

(22) Filed: Feb. 22, 2011

(65) Prior Publication Data

US 2011/0144301 A1 Jun. 16, 2011
US 2011/0288267 A2 Nov. 24, 2011

Related U.S. Application Data

(63) Continuation of application No. 12/598,480, filed as application No. PCT/EP2008/055408 on May 2, 2008, now abandoned.

(30) Foreign Application Priority Data

May 4, 2007 (DE) .......................... 10 2007 020 951

(51) Int. Cl.
| | | |
|---|---|---|
| C08G 63/08 | (2006.01) |
| C08G 63/00 | (2006.01) |
| C08G 63/90 | (2006.01) |
| B01D 11/00 | (2006.01) |
| F26B 11/02 | (2006.01) |

(52) U.S. Cl.
CPC ............... *C08G 63/90* (2013.01); *C08G 63/08* (2013.01)

(58) Field of Classification Search
CPC ................................. C08G 63/90; B01D 1/00
USPC ............. 585/450; 528/271, 354; 34/130, 108; 422/261
See application file for complete search history.

(56) References Cited

U.S. PATENT DOCUMENTS

| 4,810,775 A | 3/1989 | Bendix et al. |
| 5,585,460 A | 12/1996 | Yamada et al. |
| 6,376,643 B1 | 4/2002 | Chang et al. |

FOREIGN PATENT DOCUMENTS

| DE | 4218268 A1 | 12/1993 |
| DE | 198 00 591 A1 | 9/1998 |
| EP | 0283925 A | 9/1988 |
| ES | 2 095 827 | 3/1997 |
| GB | 2 164 329 A | 3/1986 |
| JP | 61-250025 | 11/1986 |
| JP | 63-254128 | 10/1988 |
| JP | 4-218528 A | 8/1992 |
| JP | 2711849 | 2/1998 |
| JP | 2004-313823 | 11/2004 |
| JP | 2005-264087 A | 9/2005 |
| JP | 2006-26563 A | 2/2006 |
| RU | 2 093 246 C1 | 10/1997 |

OTHER PUBLICATIONS

Ullman's Encyclopedia of Industrial Chemistry (p. 10-26 and 10-37, 1988).*
European Office Action issued May 31, 2011, in Patent Application No. 08 749 980.2.
Office Action issued Nov. 1, 2012 in Japanese Application No. 2010-506903 (Partial English Translation).
Search Report issued Apr. 4, 2012 in Russian Patent Application No. 2009144850 (with German language translation).
Office Action issued Oct. 9, 2013 in Japanese Patent Application No. 2010-506903 with English language translation.
Israeli Office Action Issued Oct. 10, 2012 in Patent Application No. 201279.
Office Action dated Apr. 29, 2014 in Chilean Application No. 1265-08 with English Translation.
Office Action issued Jul. 3, 2014, in Korean Application No. 10-2009-7023025 (with English-language Translation).

* cited by examiner

*Primary Examiner* — Randy Gulakowski
*Assistant Examiner* — Christopher M Rodd
(74) *Attorney, Agent, or Firm* — Oblon, McClelland, Maier & Neustadt, L.L.P.

(57) ABSTRACT

In a method for cleaning an absorptive polyester, the polymer is dissolved in a first solvent (12) and subsequently the polymer solution is brought into tight contact with a second solvent (41) in a turbulent shear field under the influence of strong shear forces. Here, the second solvent (41) represents a non-solvent for the absorptive polyester and is mixable with the first solvent (12) to an unlimited extent. Subsequently, the polymer suspension resulting from the addition of the second solvent (41) is conveyed onto or into a rotating, cylindrical screen body (71) of a drum shear screen (70) and then the moist polymer mass is removed from the screen body (71) and subsequently dried. The method is suitable for the production of absorptive polyester with a high degree of quality and may be performed in a cost-effective fashion on an industrial scale as well.

13 Claims, 3 Drawing Sheets

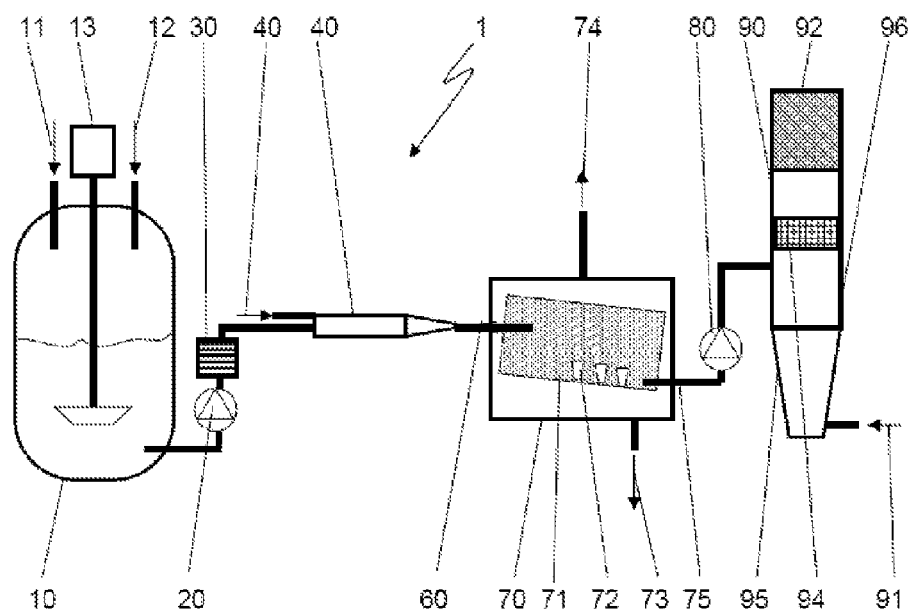
Figure 1: Schematic representation of a purifying device for resorbable polyesters for carrying out the process according to the invention Figure 2: Exploded perspective view of the drum shear screen according to Figure 1
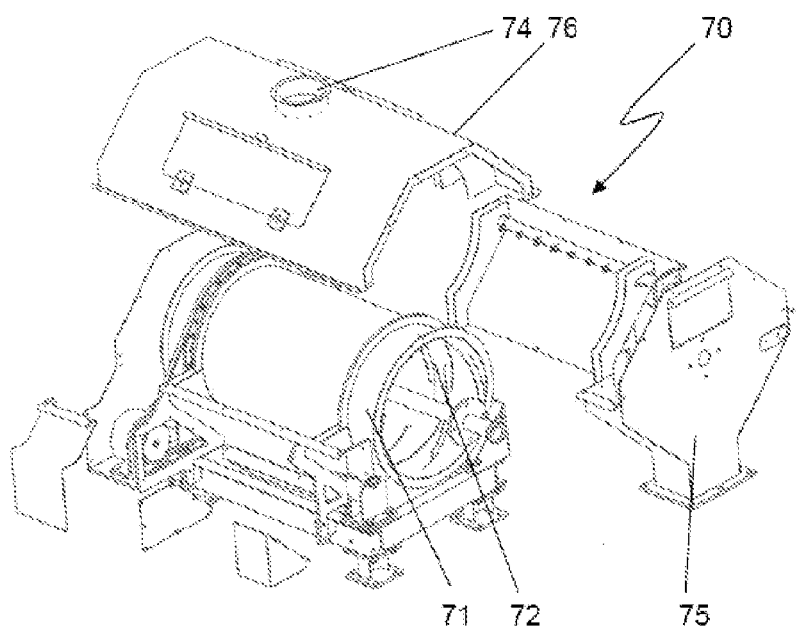

Figure 3: Perspective view of the dryer according to Figure 1.
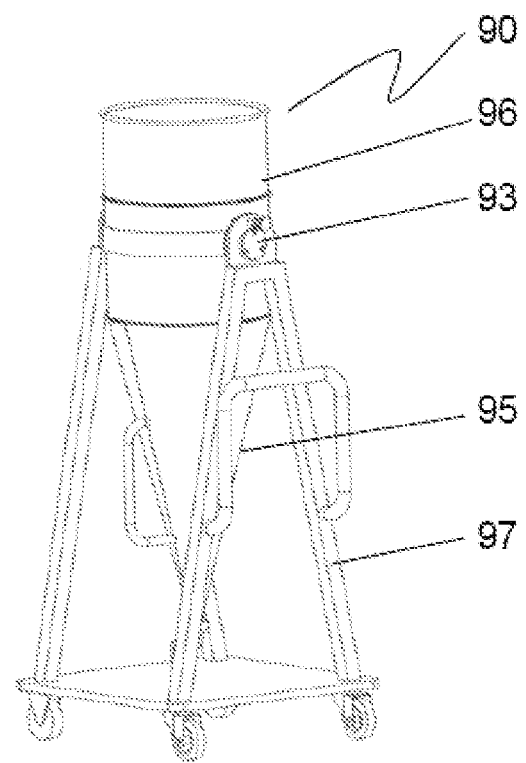

METHOD AND DEVICE FOR CLEANING AN ABSORPTIVE POLYESTER

The invention relates to a process for purifying a resorbable polyester, the polymer being dissolved in a first solvent and subsequently the polymer solution being brought into intimate contact with a second solvent under the action of high shear forces in a turbulent shear field, the first solvent being a "genuine" solvent and the second solvent being a non-solvent for the resorbable polyester and being unlimitedly miscible with the first solvent.

Furthermore the invention also relates to a resorbable polyester which is purified using the process and to the use thereof.

The invention further relates to a purification device for purifying a resorbable polyester that contains as its main components a dissolving vessel in which the polymer is dissolved in a first solvent, a separation device for separating a moist polymer mass from a polymer suspension and a dryer for drying the polymer mass.

Resorbable polyesters in the sense of the invention are homopolymers or copolymers based on lactide (L-lactide, D-lactide, DL-lactide, meso-lactide), glycolide, epsilon-caprolactone, dioxanone, trimethylene carbonate, delta-valerolactone, gamma-butyrolactone, and similar polymerisable heterocycles. The polymers can either be composed of one or else of a plurality of different monomer modules or optionally contain further modules in the polymer chain, such as for example units of ethylene glycol.

Preferred according to the invention are homopolymers of D,L-lactide, copolymers of D,L-lactide and glycolide of differing composition and block copolymers of the aforementioned polyester units and polyethylene glycol.

Resorbable polyesters are raw materials which are widely used for the production of resorbable, surgical implants and also as a pharmaceutical auxiliary for the formulation of parenteral release systems. For example, poly(lactides) and other resorbable polyesters are used in surgical implants for the fixing of bone fractures, in reticula and membranes for controlled tissue regeneration and in microcapsules and implants for subcutaneous or intramuscular injection, in particular for the controlled release of active ingredients. After implantation or injection into the body, resorbable polymers are broken down into oligomers in a slow hydrolytic reaction. Hydrolysis end products such as lactic acid or glycolic acid are metabolised into carbon dioxide and water.

The synthesis of resorbable polyesters is known in the art. They can be prepared by poly-condensation from hydroxycarboxylic acids such as lactic acid and/or glycolic acid. Another frequently taken synthesis pathway is the ring-opening polymerisation of the corresponding heterocycles.

Irrespective of the synthesis pathway, the crude polymers always contain a specific content of non-converted monomers that frequently cannot be reduced below a value of from 1 to 3% even if the corresponding synthesis processes are optimised. The reason for this is that ring-opening polymerisation is an equilibrium reaction and even during polycondensation the linear polyester is present in equilibrium with the corresponding hydroxycarboxylic acids.

The presence of monomers in the polymers is extremely problematic for the following reasons:

a) Because cyclic monomers are much more unstable in relation to hydrolytic decomposition than linear polyesters, they decompose more rapidly than polyesters on ingress of moisture. The hydrolytic decomposition generates acid equivalents which, again, the hydrolytic decomposition of the polyesters also catalyses. The implantation of monomer-containing polyesters would therefore lead to a greatly accelerated breakdown of the material in the body.

b) For the same reason, the stability in storage of monomer-containing polyesters and implants or pharmaceutical formulations produced therefrom is markedly impaired.

c) The stability of resorbable polyesters is also impaired during thermoplastic processing if residual contents of monomers are present.

d) The encapsulation behaviour of non-purified polyesters is different from that of purified polyesters, as are the release behaviour and the breakdown behaviour. Encapsulated active ingredients, such as peptides, can become damaged or destroyed as a result of the greater amount of free acid compared to purified polymers.

e) During the synthesis reactions, the residual monomer content of the crude polymer is often difficult to control. Variability in the residual monomer content then automatically also leads to intolerable batch-to-batch variations in the breakdown rate, the stability in storage and the processing stability, so materials of reproducible quality cannot be obtained without a subsequent purification step to reduce the amount of residual monomers.

Purification processes for separating residual monomers from resorbable polyesters are also known in the art.

Monomers can be removed from partially crystalline polyesters using extraction processes. Suitable for this purpose are solvents which dissolve the monomer but do not dissolve the polymer. Suitable examples include organic solvents such as n-hexane, cyclohexane, methanol, ethanol, acetone or ethyl acetate. EP 0456246 discloses for example an extraction process for resorbable polyesters that uses carbon dioxide as the solvent.

Amorphous polyester can generally not be purified by extraction processes, as the relevant solvents either also dissolve the polymer or at least cause it to swell. If supercritical or pressure-liquefied carbon dioxide is used, the polymer mass expands greatly when the pressure is relieved, and this also prevents a process of this type from being carried out. The prior art discloses a number of reprecipitation processes for the purification of amorphous polyesters. These involve dissolution of the crude polymer in a suitable solvent. The addition of a large excess of a non-solvent, which is however miscible with the solvent, causes precipitation of the polymer. For example, the reprecipitation of a poly(L-lactide)-poly(ethylene glycol)-poly(L-lactide) by dissolution in chloroform and precipitation in methanol or methanol/chloroform mixtures is disclosed (J. Matsumotot et al.; Int. J. of Pharm.; 185; 1999; 93-101). The disclosed reprecipitation processes have the drawback of using a huge amount of organic solvents and, in addition, the solid/liquid phase separation, and thus the product isolation, is extremely difficult. This is in particular due to the fact the polyesters tend to agglomerate at the contact point at which the polymer solution enters into contact with the non-solvent. Application on an industrial scale is therefore difficult.

U.S. Pat. No. 4,810,775 discloses a purification process for resorbable polyesters having crystallinity of up to 20%, the polymer being dissolved in a solvent, the polymer solution subsequently being brought into intimate contact with a precipitant under the action of high shear forces in a turbulent shear field. The turbulent shear field is generated by a device consisting of a two-fluid nozzle and of a container which is filled with precipitant and into which the two-fluid nozzle protrudes, so the precipitating polymer is broken down into very small particles. However, it is not disclosed how a process of this type can be carried out economically on a large scale. The phase separation of the polymer suspension formed during the reprecipitation is carried out either in a centrifuge or by collection in receptacles which, owing to the large amount of solvent required, must be large even in relatively small batch sizes.

The object of the invention is therefore to provide an improved purification process for purifying a resorbable polyester, in particular an amorphous polyester, of the type mentioned at the outset that allows a resorbable polyester of high and reproducible quality to be obtained even on an industrial scale. It is furthermore the object of the invention to provide a corresponding device for the process according to the invention.

The object concerning the process is achieved according to the invention in that subsequently the polymer suspension, which is formed by the addition of the second solvent, is conveyed onto or into a rotating, cylindrical screen body of a drum shear screen and subsequently the moist polymer mass is separated from the screen body and subsequently dried thereon.

This provides a continuously operating separation process which allows the polymer suspension to be separated with high reproducibility into the solid and liquid phase. The continuous mode of operation allows batches of constant quality to be provided irrespective of the amount.

In terms of the process, provision is made for the first solvent used to be acetone, ethyl acetate, 1,4-dioxane, dimethylacetamide, tetrahydrofuran, toluene, dimethylformamide, dimethylsulphoxide, hexafluoroisopropanol or another halogenated hydrocarbon or a mixture of the aforementioned solvents. A suitable solvent is thus provided depending on the type of polyester and the inherent viscosity of the polyester in solution. Acetone, chloroform or dichloromethane have been found to be particularly suitable as the first solvent.

Preferably, the second solvent used is ethanol, methanol or water or a mixture of the aforementioned solvents. Particularly effective precipitation reactions can thus be achieved, depending on the first solvent used, water in particular being used as the second solvent. Water is non-toxic and non-explosive but cost-effective and particularly environmentally acceptable.

According to a development, the resorbable polyester which is dissolved in the first solvent is filtered and subsequently mixed with the second solvent via a two-fluid nozzle. This produces an intimate contact under the action of high shear forces in the turbulent shear field, as a result of which optimum thorough mixing is achieved. Alternative intensive thorough mixing can also be achieved if both media are injected from two separate nozzles into a flow tube and a fluidised bed is generated at the contact point by means of a rapidly rotating stirrer.

Advantageously, the moist polymer mass is separated effectively by means of gravity and by means of one or more helically attached conveyor rails and/or guide blades inside the rotating, cylindrical screen body. This provides restricted conveyance which allows the polymer mass to be conveyed continuously, for example into a receptacle.

In order to obtain a low residual moisture or residual solvent content, for drying the moist polymer mass, nitrogen or air is expediently passed therethrough in a dryer.

The process according to the invention can be used to purify cost-effectively and with constant quality, in particular, resorbable polyesters having an amorphous or partially crystal-line structure.

Resorbable polyesters purified in this way preferably contain one or more units derived from lactide (L-lactide, D-lactide, DL-lactide, meso-lactide), glycolide, trimethylene carbonate, epsilon-caprolactone, gamma-butyrolactone, dioxanone, delta-valerolactone and/or similar polymerisable heterocycles and/or polyethylene glycols. Particularly preferred is a resorbable polyester which is composed of D,L-lactide or copolymers of D,L-lactide and glycolide having any desired composition or a block copolymer of D,L-lactide, or D,L-lactide-co-glycolide having any desired composition and polyethylene glycol.

The residual monomer content, after the purification has been carried out using the process according to the invention, is less than 1%, in particular less than 0.5%, a residual monomer content of below 0.1% being achievable.

After the drying, the solvent and/or moisture content of the resorbable polyester is less than 2%, values of below 1%, in particular values of below 0.5% being achieved under beneficial settings. If dried particularly intensively, the solvent and/or moisture content of the resorbable polyester is <0.1%.

A particularly preferred use of the resorbable polyester provides for the production of pharmaceutical formulations or resorbable implants.

The object concerning the purification device is achieved according to the invention in that the separation device is constructed as a drum shear screen comprising a rotating, cylindrical screen body.

With this type of separation device, such as has previously been used for example in other fields for the continuous dehydration of high solid loads, it has surprisingly been found that the device allows polymer suspensions formed from a precipitation reaction to be separated cost-effectively and at constant quality into a polymer mass and into solvent residues even if the throughput fluctuates.

Conveyor rails and/or guide blades inside the cylindrical screen body allow, in conjunction with the rotational movement of the screen body, the polymer mass to be conveyed continuously into, for example, a receptacle.

In an advantageous embodiment the drum shear screen has a suction device, in particular comprising a suction nozzle, above the rotating, cylindrical screen body in an upper housing cover. This provides removal of solvent vapours by suction, and this is particularly advantageous if, for example, acetone, ethanol or methanol is used, as the suction device allows the explosion protection class of the surrounding building to be reduced.

A dryer which is configured as a fluidised bed dryer, circulating air dryer or tubular-flow dryer is particularly suitable for effective drying of the moist polymer mass. The dryer has in a preferred embodiment a conical portion and a cylindrical portion, intensive swirling of the polymer mass to be dried being achieved in the conical portion of the dryer owing to the drying agent, for example nitrogen or air, which flows in from below. In order to reduce agglomeration, a grater is provided for the polymer. During drying, the polymer mass to be dried can be removed from the dryer and grated via the grater, after which the drying is continued.

In order to prevent the polymer from passing out of the dryer into a supply system, the dryer has inside the cylindrical portion at least one screen insert. For collecting the purified resorbable polyester, the dryer expediently comprises a filter bag. A swivel bearing of the dryer in a frame allows the dryer to be tilted, thus allowing the filter bag which is fastened to the dryer on the end side and comprises the dried polymer powder easily to be removed. Moreover the polymer mass to be dried can be mixed thoroughly more easily during the drying process.

According to a further configuration at least the product-guiding parts of the drum shear screen and of the dryer are made of stainless steel, thus ensuring high product quality with regard to pharmacological requirements.

It will be understood that the above-mentioned features and those which will be described hereinafter can be used not only in the respectively specified combination but rather also in other combinations. The scope of the invention is defined merely by the claims.

The invention will be described hereinafter in greater detail using an exemplary embodiment and with reference to the associated drawings, in which:

FIG. 1 Is a schematic view of a purification device for resorbable polyesters for carrying out the process according to the invention, FIG. 2 is a perspective exploded view of the drum shear screen according to FIG. 1, and FIG. 3 is a perspective view of the dryer according to FIG. 1.

A purification device 1 comprises as its main component for a first process step a dissolving vessel 10 in which a polyester crude product 11 to be purified is placed. A typical size of the dissolving vessel 10 is in the range of from 50 to 1,000 l and can, in the case of larger systems, be as much as 2,000 l or more. The addition of a first solvent 12 causes dissolution in the dissolving vessel 10 of the polyester crude product 11 with the aid of a stirrer 13 and/or by constant recirculation of the solution Impurities in the polyester crude product 11, for example in the form of lint, are separated, for example by filtration. The following solvents have, for example, been found to be preferred first solvents 12: acetone, ethyl acetate, 1,4-dioxane, dimethylacetamide, tetrahydrofuran, toluene, dimethylformamide, dimethylsulphoxide, hexafluoroisopropanol or another halogenated hydrocarbon or a mixture of the aforementioned solvents. In the resorbable polyesters, acetone, chloroform or dichloromethane have proven particularly suitable as first solvents 12.

A pump, for example a diaphragm pump, is used to pump the polymer solution via a filter 30 containing a fine-meshed screen, preferably made of stainless steel. In this step insoluble impurities are separated off. Typical mesh sizes are in this case a few µm, typically in the range of from 1 to 10 µm.

Subsequently, the polymer solution is intensively mixed via a two-fluid nozzle 40 by means of a second solvent 41, which is a non-solvent for the polymer, and the polymer suspension resulting therefrom is guided into the interior of a rotating screen body 71 of a drum shear screen 70 via a conveyor 60, in the simplest case directly or via a flow tube or a pipe, wherein the conveyance can be carried out by means of gravity, conventional pumps or by pressurisation by means of a gas. The second solvent 41 used is ethanol, methanol or water or a mixture of the aforementioned solvents for precipitation. Water is a particularly preferred second solvent 41 owing to its toxicological safeness and environmental acceptability.

Inside the rotating screen body 71 of the drum shear screen 70, the polymer suspension can be separated into the solvent mixture and into the precipitated polymer mass. One or more helically attached guide rails and/or guide blades 72 inside the screen body 71 subject the polymer mass to restricted conveyance, so the polymer mass is transported to a solid outlet 75. The solvent mixture can in this case flow away downward through a liquid outlet 73. Solvent vapours can be removed by suction via a suction device 74, for example a suction nozzle, in a housing cover 76 of the drum shear screen 70 above the screen body 71, and this is advantageous with regard to the explosion protection class of the surrounding building.

The still-moist polymer mass which collects at the solid outlet 75 is transported using a solid conveyor 80 either directly into a dryer 90 or into a collection vessel. Batchwise filling of the dryer 90 from the collection vessel is possible in addition to continuous feeding. The dryer 90 has a conical portion 95 and a cylindrical portion 96. At least one screen insert 94 is provided inside the cylindrical portion 96. The drying agent 91, for example nitrogen or air, is introduced laterally from below into the conical portion 95 of the dryer 90, so intensive swirling is achieved inside the dryer 90. The dryer 90 has a filter bag 92 for collecting the purified and dried resorbable polyester.

In the configuration of the drum shear screen 70 according to FIG. 2, there may be seen on the inside the rotating screen body 71 into which the polymer suspension can be introduced via a U-shaped channel. The screen body 71 is positioned slightly obliquely. One or more helically attached guide rails and/or guide blades 72 inside the screen body 71 cause the restricted conveyance of the polymer mass to the solid outlet 75. Solvent vapours are removed by suction via the suction device 74 in the housing cover 76 of the drum shear screen 70 above the screen body 71. The screen body 71 is closed on its back to prevent the inside of the screen from becoming contaminated with abraded material from the drive unit. The back can be opened for purification purposes.

The dryer 90 according to FIG. 3, which is arranged in a movable frame 97, can be tilted by means of a swivel bearing 93. The filter bag 92 is not shown. Moreover at least the product-guiding parts of the drum shear screen 70 and of the dryer 90 are made of stainless steel.

The process according to the invention will be described hereinafter:

The polyester crude product 11 is dissolved with the previously calculated amount of acetone as the first solvent 12. The polyester crude product 11 is weighed out and placed in the dissolving vessel 10. The calculated amount of acetone is added and the crude product dissolved by recirculation within approx. 24-72 hours. The mixing ratio is dependent on the starting substances used (monomers or heterocycles) and the inherent viscosity of the crude product and is, for example in a copolymer of D,L-lactide and glycolide; 50:50 mol %; inherent viscosity of 0.5 dl/g measured as a 0.1% solution in chloroform; solution for precipitation is dispensed with, 8% by weight of polymer in acetone.

The polymer solution is conveyed into the two-fluid nozzle 40 by means of the pump 20 via a filter 30 made of stainless steel having a mesh size of 5 µm and a flowmeter. The flow is dependent on the nature of the crude product used and is generally up to 20 l/h.

This figure relates to a flowmeter which is adjusted to the density of acetone. The differing densities of the polymer solutions to be precipitated prevent precise flow measurement (except for mass flowmeters). In the two-fluid nozzle 40 the polymer solution is injected into a water jet at a flow rate of approx. 700-1000 l/h, the dissolved crude product precipitating immediately in the form of flakes or fibres.

The suspension, consisting of water, product flakes, monomer and acetone, is guided into the drum shear screen 70 via a pipe. In this case the suspension is guided into the rear region of the drum shear screen 70. As a result of the rotational movement, the discharging water/acetone mixture, which contains the monomers to be separated off, initially forms a product layer at this location. If the product layer is sufficiently heavy, it becomes detached from the wall and forms a product cluster (snowball system). As a result of the guide blades 72, which run obliquely forward, and the rotational movement, these product clusters are slowly conveyed toward the solid outlet 75 in the screen body 71. The water/acetone mixture is separated off, on the one hand, by means of gravity and, on the other hand, by wedge-shaped screen profile bars and the Coandă effect resulting therefrom.

The solid is guided into the dryer 90 or the collection vessel by means of the solid conveyor 80. In the dryer 90, which is configured as a tubular-flow dryer, the moist polymer mass is dried by means of a throughflow of air or nitrogen.

The invention claimed is:

1. A process for purifying a resorbable polyester, comprising:
    (a) dissolving the resorbable polyester in a first solvent to form a polymer solution, wherein the polyester is soluble in the first solvent;
    (b) intimately contacting the polymer solution with a second solvent under action of high shear forces in a turbulent shear field to form a polymer suspension, wherein the resorbable polyester is not soluble in the second solvent and the second solvent is miscible with the first solvent;
    (c) introducing the polymer suspension into a rotating, cylindrical screen body of a drum shear screen wherein said drum shear screen is obliquely positioned downward along its length relative to the horizontal plane of the body of the apparatus;
    (d) separating the polymer suspension into a moist polymer mass and a solvent mixture;
    (e) removing the solvent mixture through a liquid outlet;
    (f) conveying the moist polymer mass through the rotating, cylindrical screen body to a solid outlet of the drum shear screen wherein one or more helically attached conveyor rails and/or guide blades are present inside the rotating, cylindrical screen body;
    (g) separating the moist polymer mass from the screen body through and
    (h) drying the polymer mass to obtain a purified resorbable polyester.

2. The process according to claim 1, wherein the first solvent is acetone, ethyl acetate, 1,4-dioxane, dimethylacetamide, tetrahydrofuran, toluene, dimethylformamide, dimethylsulphoxide, hexafluoroisopropanol or another halogenated hydrocarbon or a mixture of the aforementioned solvents.

3. The process according to claim 2, wherein the first solvent is acetone, chloroform or dichloromethane.

4. The process according to any one of claims 1 to 3, wherein the second solvent is ethanol, methanol or water or a mixture thereof.

5. The process according to claim 1, further comprising:
    filtering the polymer solution;
    and subsequently mixing the filtered polymer solution with the second solvent via a two-fluid nozzle.

6. The process according to claim 1, wherein the drying comprises passing nitrogen or air through the polymer mass in a dryer.

7. The process according to claim 1, wherein the resorbable polyester is an amorphous polyester or partially crystalline polyester.

8. The process according to claim 1, wherein the resorbable polyester comprises one or more units derived from a lactide glycolide, trimethylene carbonate, epsilon-caprolactone, gamma-butyrolactone, dioxanone, deltavalerolactone and/or similar polymerisable heterocycles and/or polyethylene glycols;
    wherein said lactide is at least one member selected from the group consisting of L-lactide, D-lactide, DL-lactide, and meso-lactide.

9. The process according to claim 1, wherein the resorbable polyester comprises a copolymer of lactide and glycolide and/or polyethylene glycols.

10. The process according to claim 1, wherein a residual monomer content of the purified resorbable polyester is less than 1%.

11. The process according to claim 1, wherein a solvent and/or moisture content of the purified resorbable polyester is less than 2%.

12. The process according to claim 1, wherein the process is a continuously operating separation process and a residual monomer content of the separated resorbable polyester solid is less than 1%.

13. The process according to claim 1, wherein the process is a continuously operating separation process and a residual monomer content of less than 1% and a solvent and/or moisture content of less than 2% of the purified resorbable polyester mass is obtained irrespective of the amount of polymer suspension.

* * * * *